April 26, 1938. A. F. TREMBLAY 2,115,051
GLASS ARTICLE SHAPING MACHINE
Filed March 9, 1935 11 Sheets-Sheet 1

Inventor
Albert F. Tremblay
By
Attorney

April 26, 1938. A. F. TREMBLAY 2,115,051
GLASS ARTICLE SHAPING MACHINE
Filed March 9, 1935 11 Sheets-Sheet 2

Inventor
Albert F. Tremblay
By
Attorney

April 26, 1938. A. F. TREMBLAY 2,115,051
GLASS ARTICLE SHAPING MACHINE
Filed March 9, 1935 11 Sheets-Sheet 5
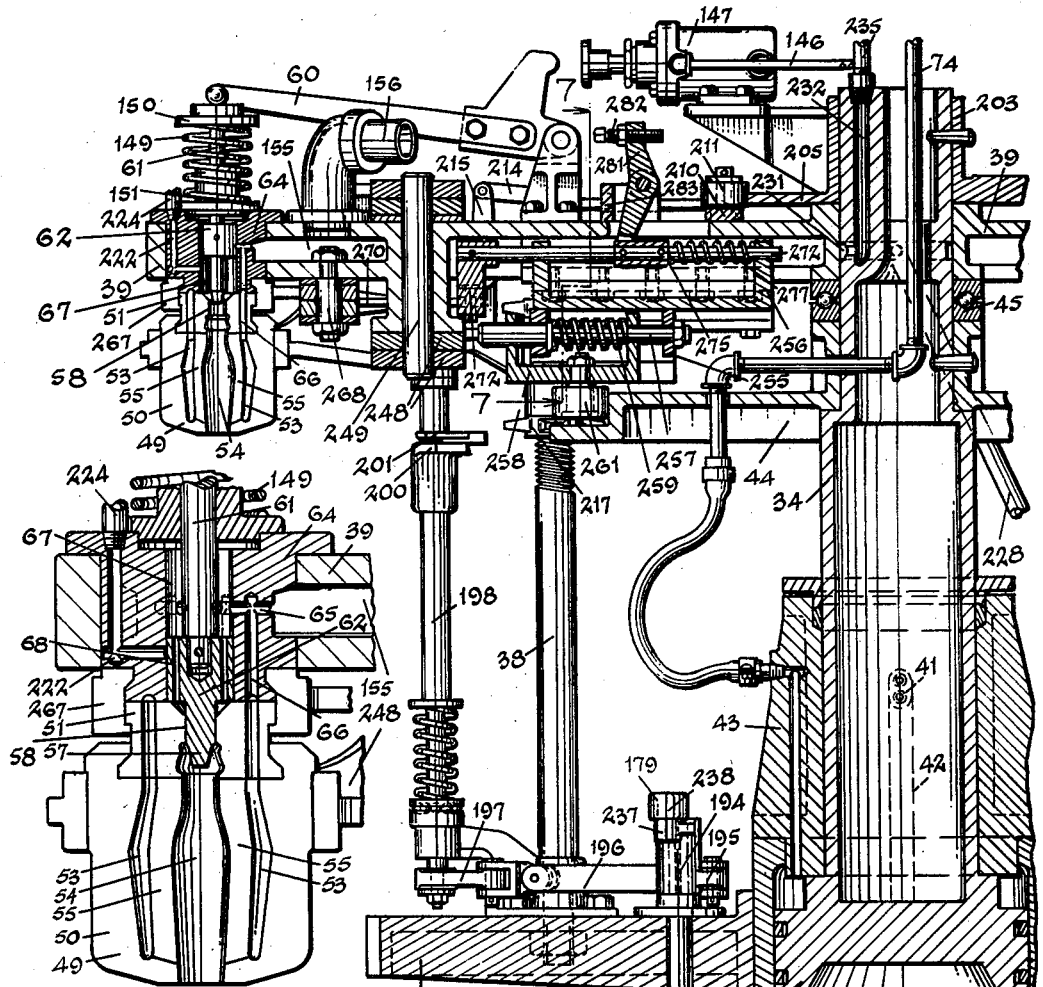
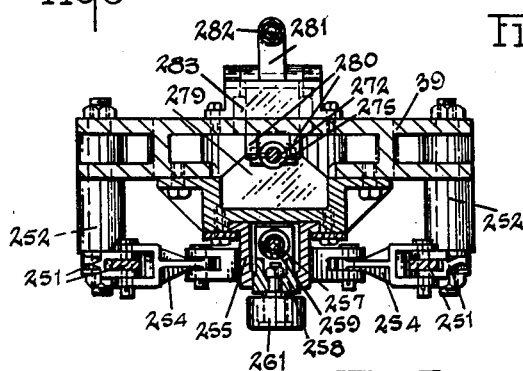
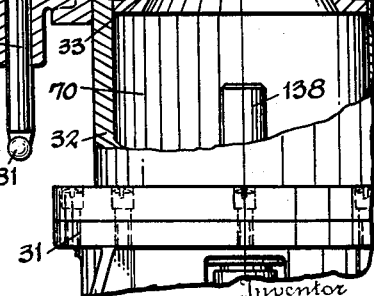
Inventor
Albert F. Tremblay
Attorney April 26, 1938. A. F. TREMBLAY 2,115,051
GLASS ARTICLE SHAPING MACHINE
Filed March 9, 1935 11 Sheets-Sheet 6
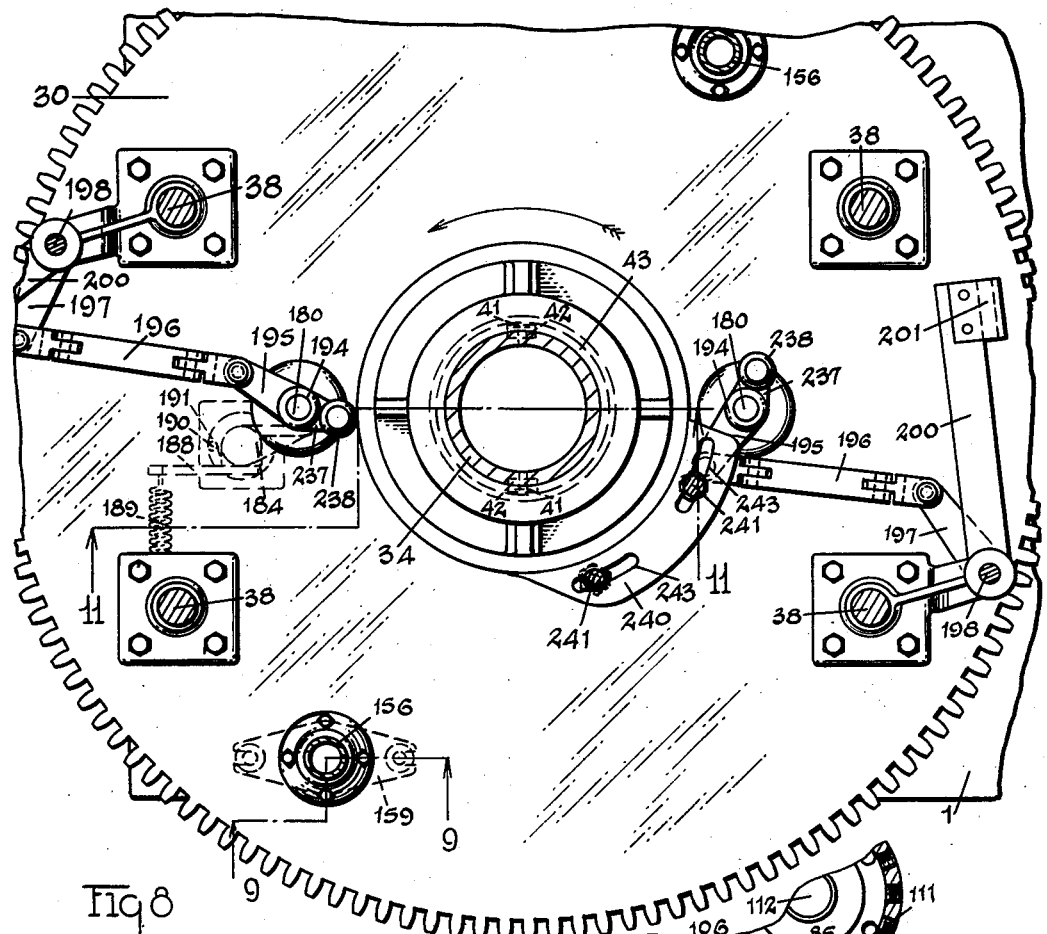
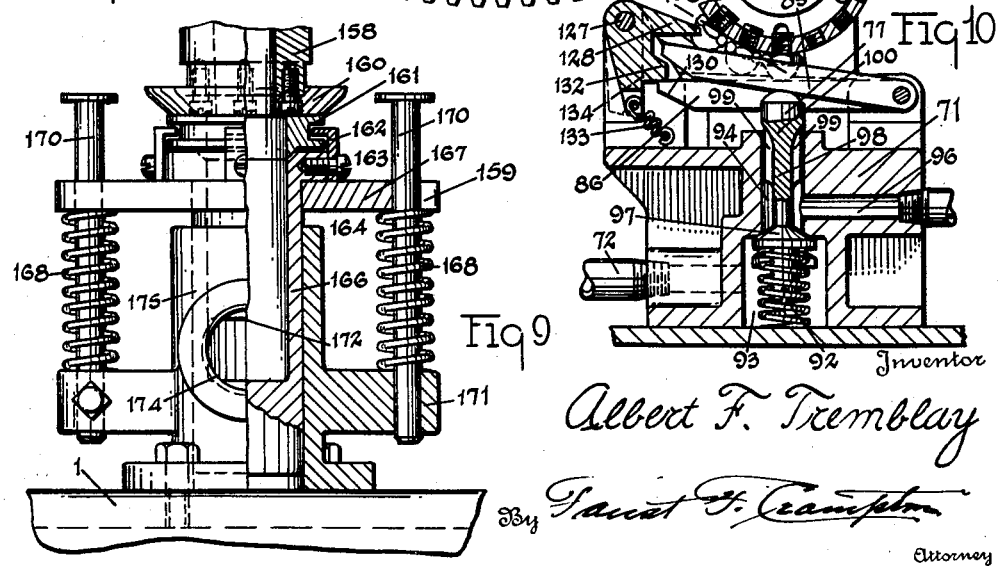

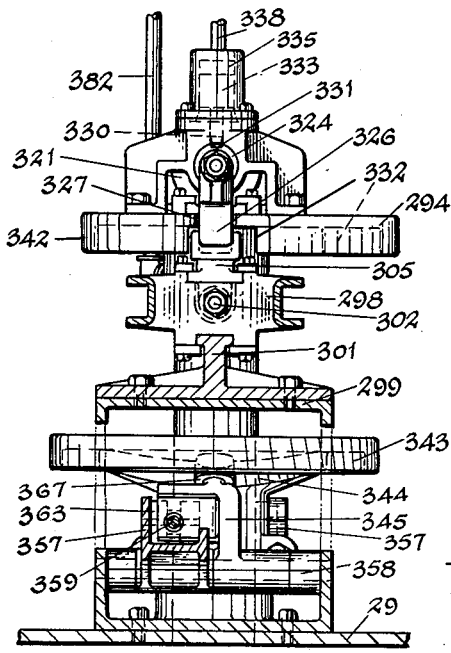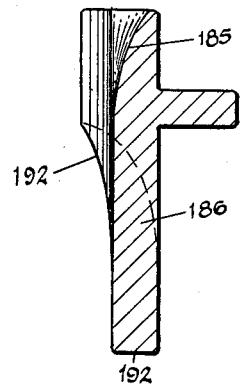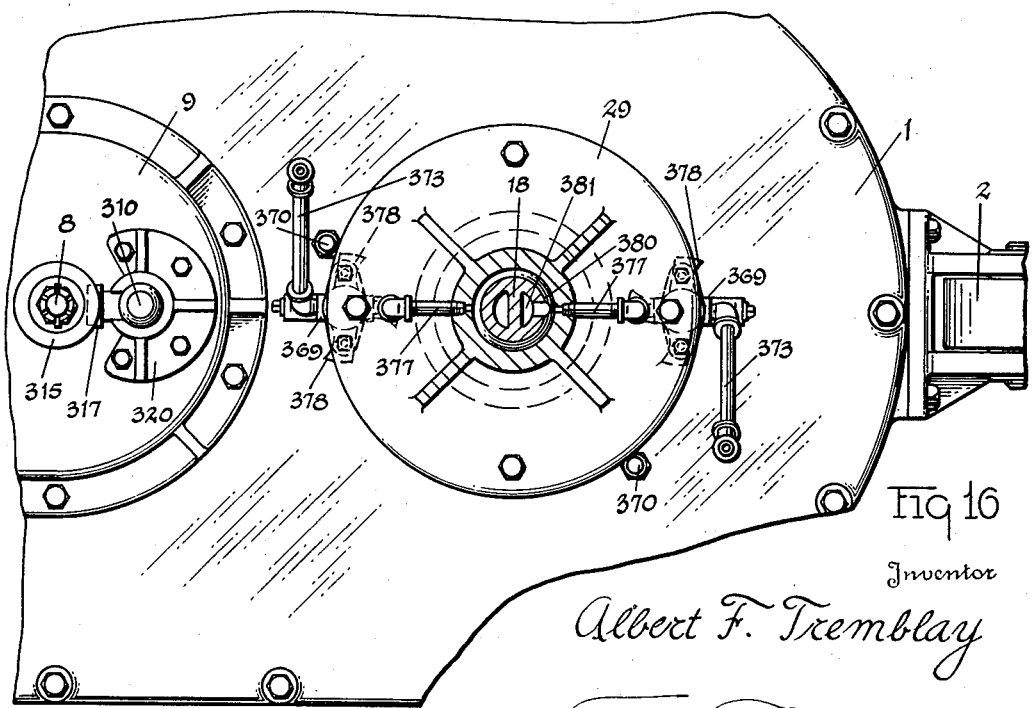

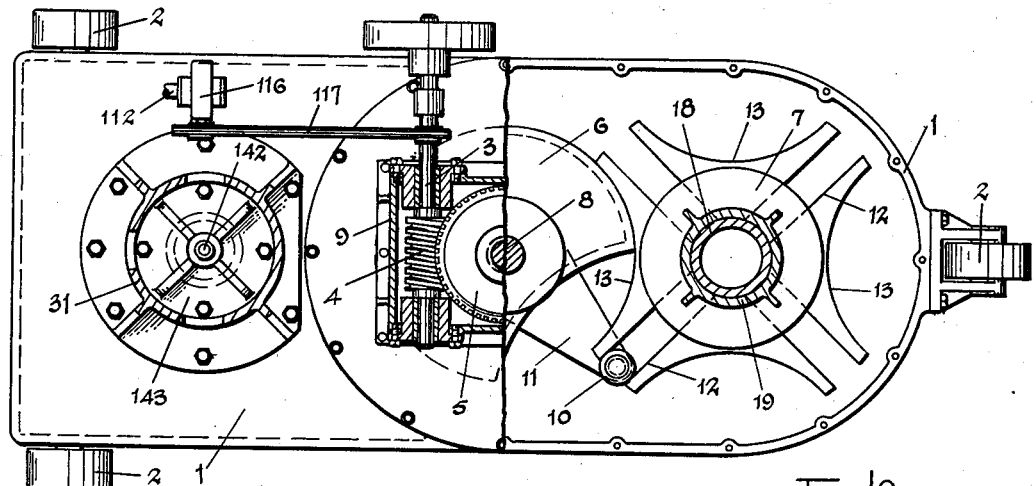
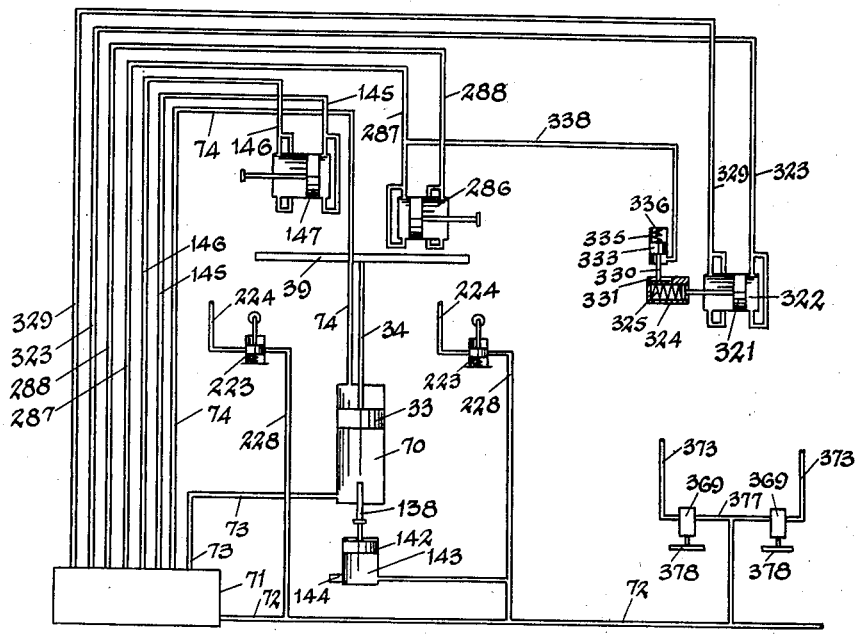

Patented Apr. 26, 1938

2,115,051

UNITED STATES PATENT OFFICE 2,115,051

GLASS ARTICLE SHAPING MACHINE

Albert F. Tremblay, Toledo, Ohio, assignor to Kent-Owens Machine Company, Toledo, Ohio, a corporation of Ohio Application March 9, 1935, Serial No. 10,256

34 Claims. (Cl. 49—5)

My invention has for its object to provide an article forming machine wherein parisons are first formed and are subsequently delivered to article forming molds that shape the glass of the parisons into articles. The invention particularly provides means for gathering the glass in the parison mold and manipulating the sections of the parison mold and the article shaping molds to deliver the glass from the parison mold to the article shaping molds and then shaping the glass of the parisons into the articles as the article shaping molds are moved to the delivery point of the articles.

The invention also provides a novel control mechanism for controlling air pressure actuated elements whereby synchronous movements are performed with reference to the moving molds. The invention also provides pedestal supporting members that support fixed actuating elements and rotatably support inter-meshing platform gears that carry movable elements whereby the elements supported on the pedestal produce movement of the elements supported on the gear wheels, relative to the pedestal and the gear wheels, to perform controlling functions in timed relation with respect to the movement of the gear wheels.

The invention consists in other features and advantages which will appear in the following description and upon examination of the drawings. Structures containing the invention may partake of different forms and may be varied in their details and still embody the invention. To illustrate a practical application of the invention, I have selected a glass forming machine as an example of the various structures and details of such structures that contain the invention, and shall describe the selected structure hereinafter, it being understood that certain features of my invention may be used to advantage without a corresponding use of other features of the invention and without departing from the spirit of the invention as presented in the claims. The particular structure selected is shown in the accompanying drawings.

Figure 1:
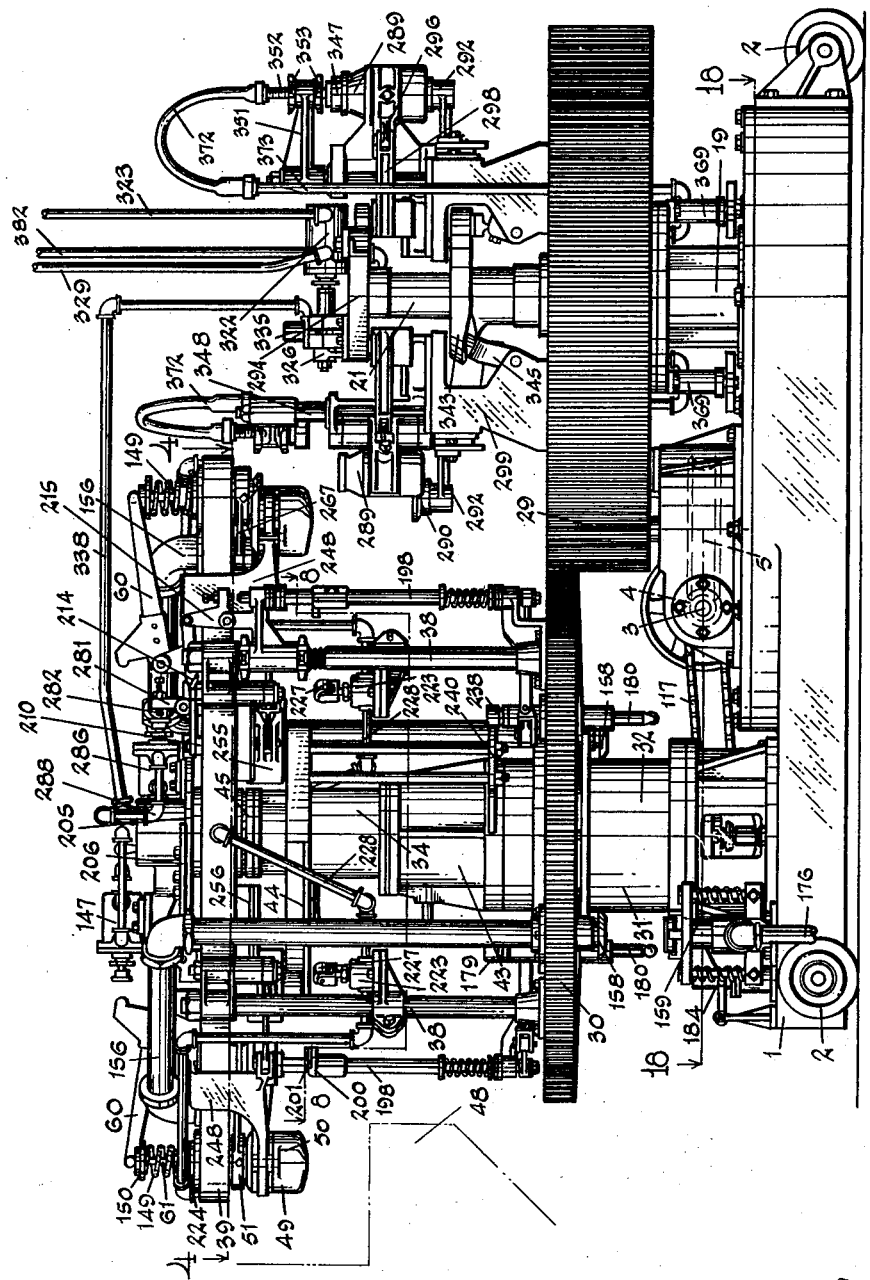
Figure 2:
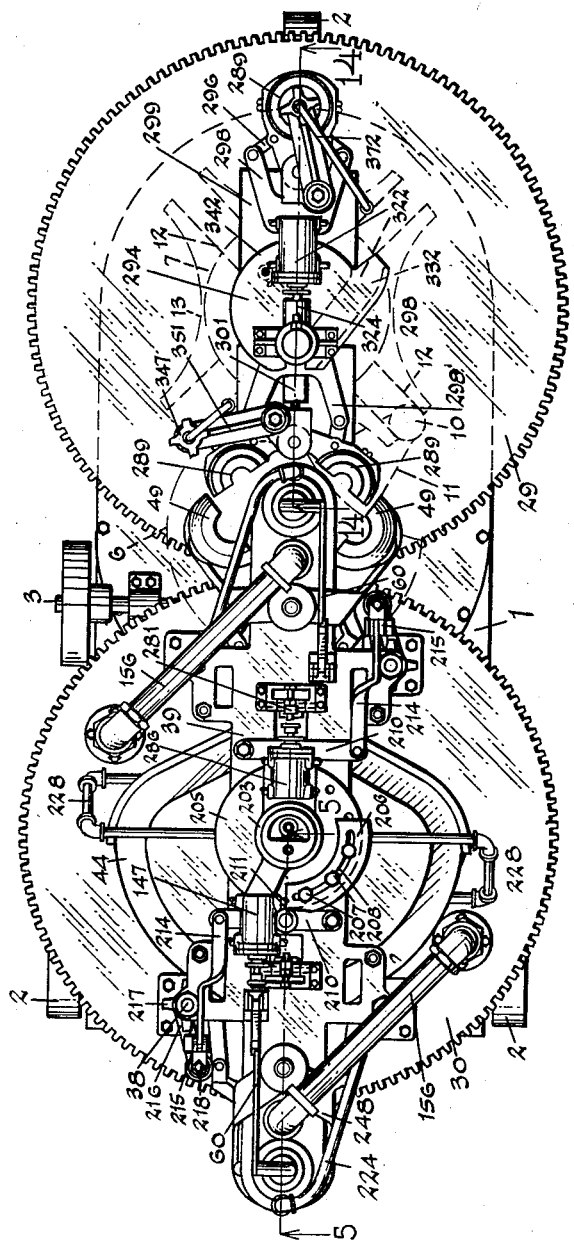
Figure 3:
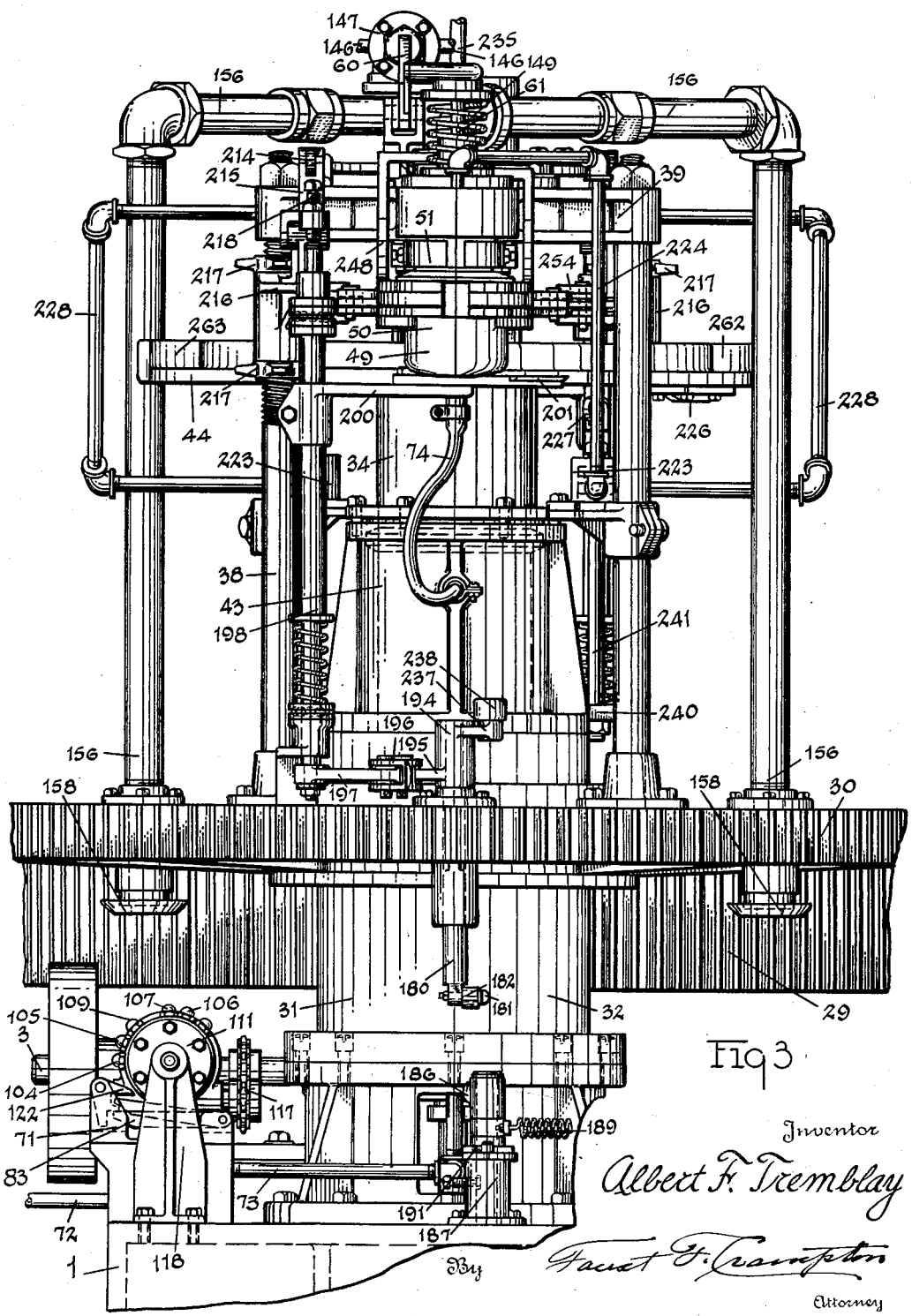
Figure 4:
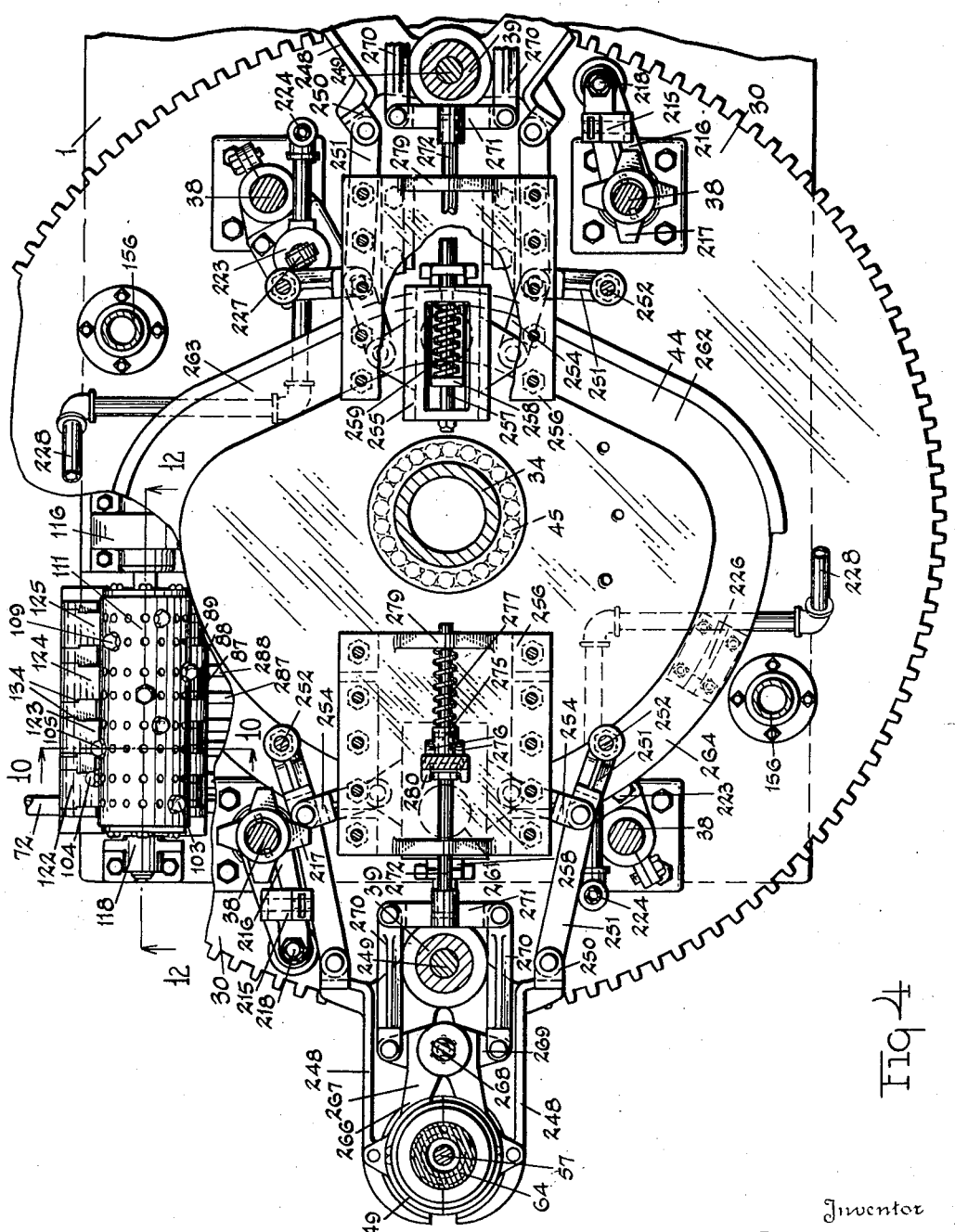
Figure 11:
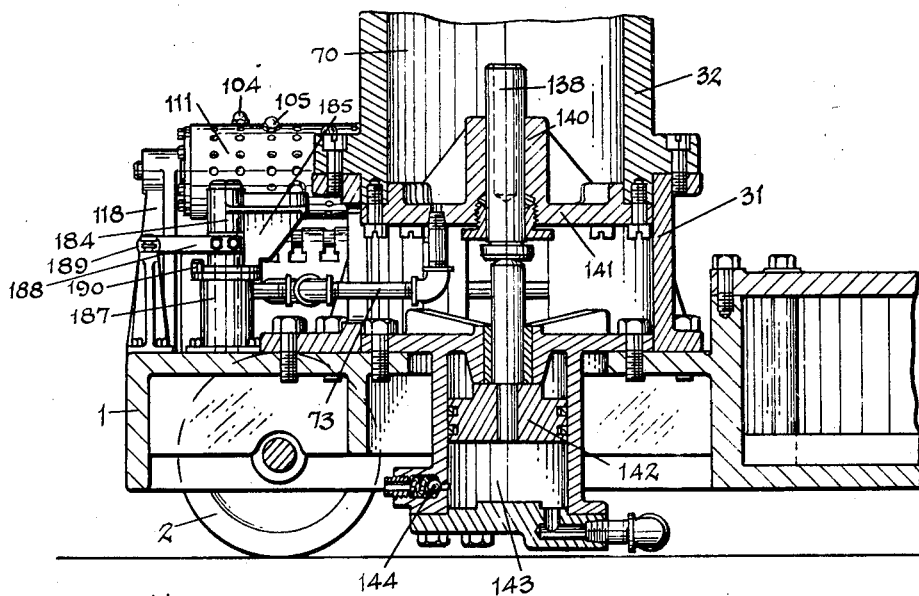
Figure 12:
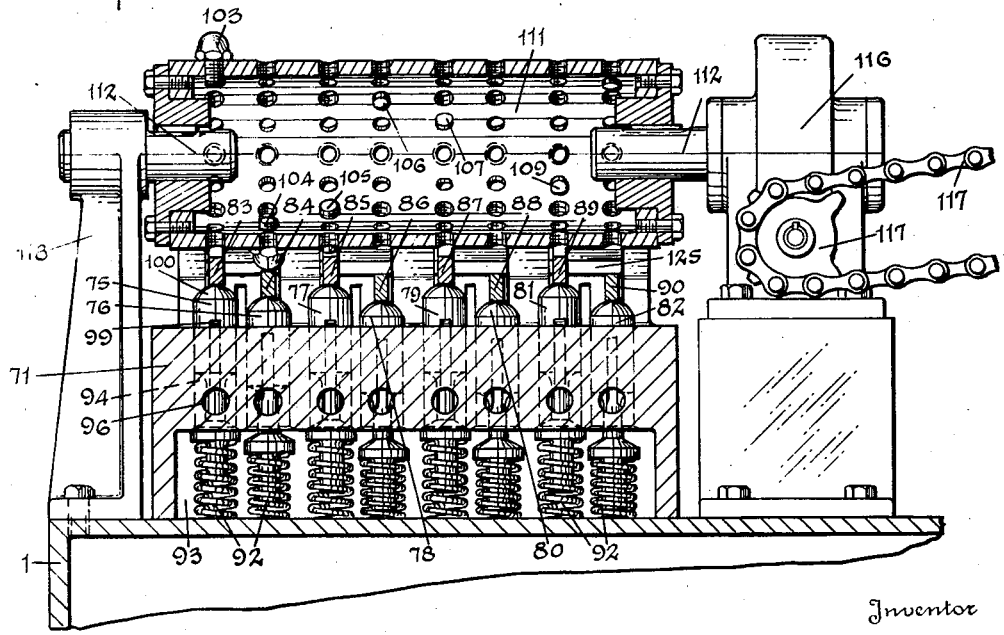
Figure 13:
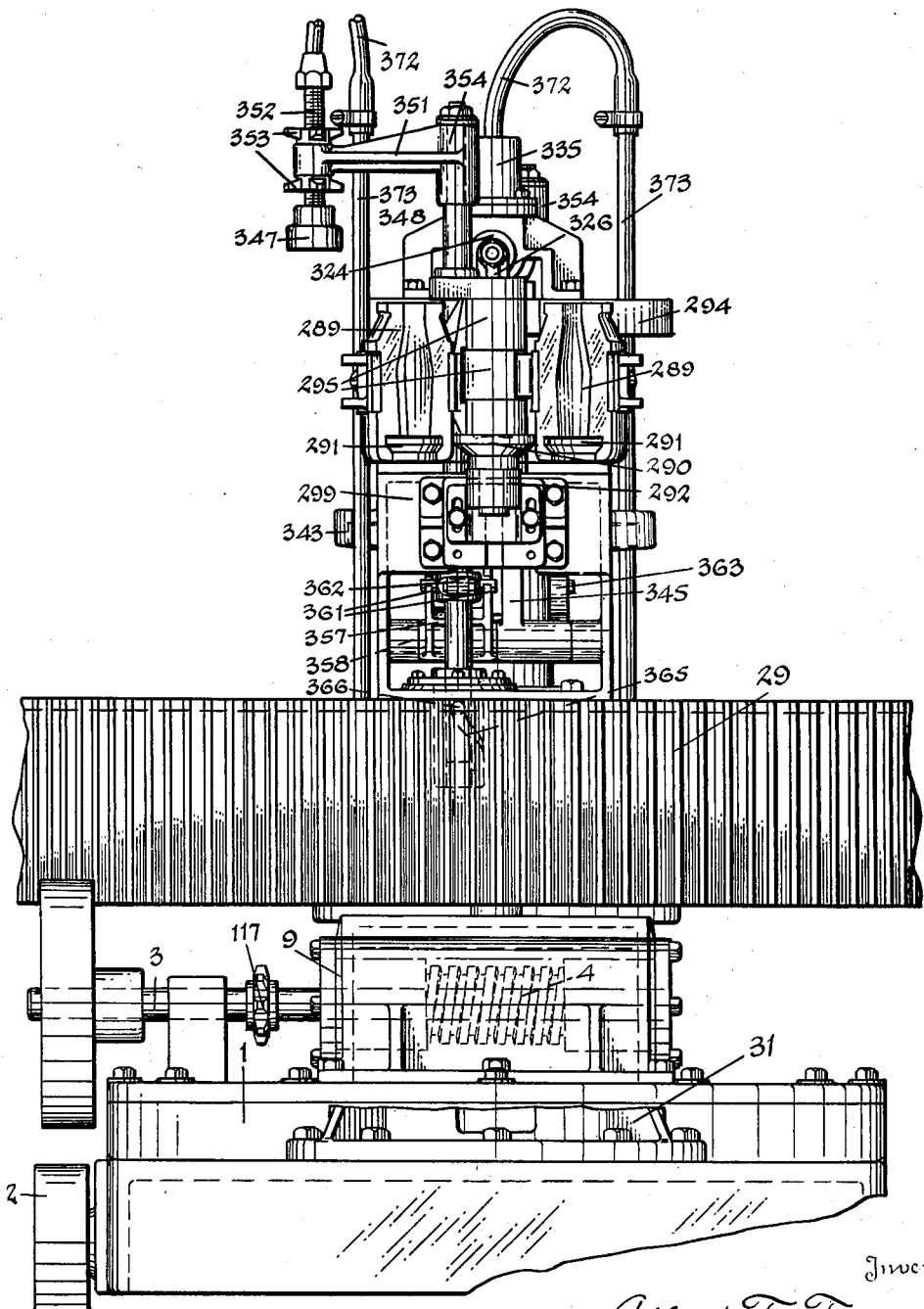
Figure 14:
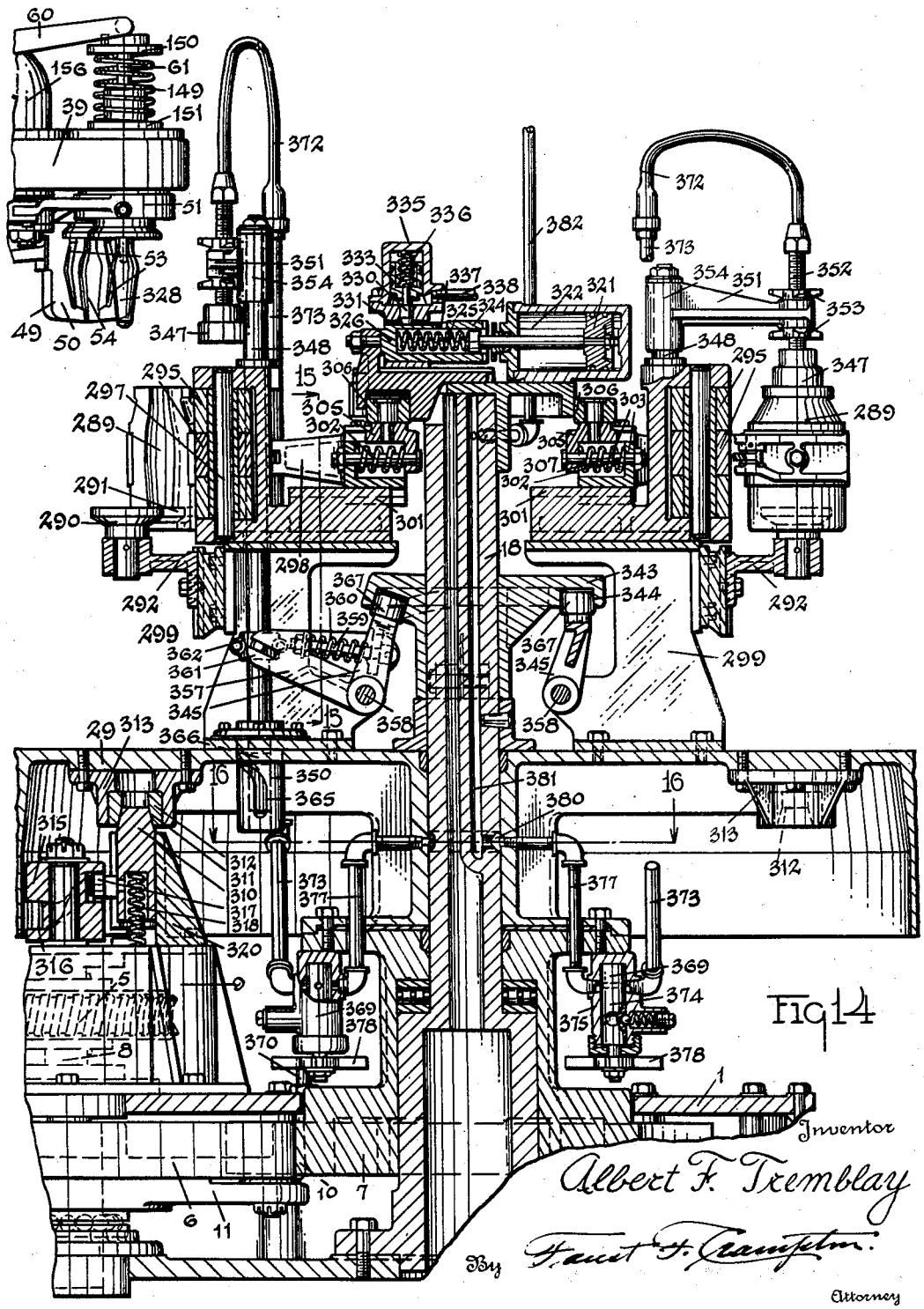

Fig. 1 illustrates a side view of the machine selected as an example of the machine containing my invention. Fig. 2 is a top view of the machine. Fig. 3 is an enlarged view of one end of the machine. Fig. 4 is a view of a sectional part taken on the broken line 4—4 indicated in Fig. 1 and shows a control mechanism for operating the parison shaping mold. Fig. 5 is a view of a section taken on the plane of the line 5—5 indicated in Fig. 2. Fig. 6 is an enlarged view of the parison shaping mold shown in Fig. 5. Fig. 7 is a view taken on the plane of the line 7—7 indicated in Fig. 5. Fig. 8 is a view of a sectional part taken on the broken line 8—8 indicated in Fig. 1. Fig. 9 is a broken sectional view, the sectional parts taken on the broken line 9—9 indicated in Fig. 8. Fig. 10 illustrates a view of a section taken on the plane of the line 10—10 indicated in Fig. 4. Fig. 11 is a broken view of a section taken on the plane of the line 11—11 indicated in Fig. 8 showing parts located below the gear shown in Fig. 8. Fig. 12 is a view of a section taken on the plane of the line 12—12 indicated in Fig. 4. Fig. 13 is an end-wise view of the article shaping part of the machine, the parison forming part of the machine being shown removed. Fig. 14 is a view of a section taken on the plane of the line 14—14 indicated in Fig. 2. Fig. 15 is a view of a section taken on the plane of the line 15—15 indicated in Fig. 14. Fig. 16 is a view of a section taken on the plane of the line 16—16 indicated in Fig. 14. Fig. 17 illustrates a section of a cam for actuating the shear mechanism. Fig. 18 is a view of a section taken on the plane of the line 18—18 indicated in Fig. 1. Fig. 19 illustrates diagrammatically the pneumatic interconnection of parts of the machine. Fig. 20 is a diagrammatic view of the relative timing of the air valves and the rotation of the mold carriers.

In the form of construction selected as an example of an embodiment of the invention and shown in the drawings, the machine is supported upon a movable bed 1 that is supported upon the rollers 2 whereby the machine may be readily moved from place to place and located in desired positions relative to the shelf of a glass furnace and with reference to an article receiving conveyor or container or chute or, if desired, with reference to a lehr wherein the glass articles may be heat treated and tempered.

Power is transmitted from a motor through suitable mechanical elements to actuate parts of the machine. Also certain parts are actuated and inter-controlled pneumatically to produce desired machine operations.

A suitable shaft 3 may be driven by an electric motor and carries a worm 4 that drives a worm gear 5 and rotates one part 6 of a Geneva gear that inter-engages and intermittently actuates the other part 7 of the Geneva gear (Figs. 1 and 18). The gear 5 is keyed to a shaft 8 rotatably supported in the bed 1 and parts of the frame 9 of the machine. The part 6 is provided with a roller 10 located on an arm 11 that enters the slots 12 during each rotation of the part 6 of the Geneva gear and produces intermittent movement of the part 7. The part 6 is circular in form and interfits with the concave portions 13 to prevent displacement of the part 7 when the roller 10 is disengaged from the slots 12. The slots extend radially and are spaced angularly 90 degrees from each other so that the part 7 is moved 90 degrees during each 360 degree movement of the part 6, the part 7 remaining stationary during the remaining 270 degree movement of the part 6 and thereby producing the intermittent stationary periods during which the parts of the machine are actuated for gathering glass and transferring the parisons to the article shaping part of the machine.

The intermittently moving part 7 of the Geneva gear is rotatably supported upon a pedestal 18 secured to the bed 1 of the machine. The pedestal 18 extends vertically upward and supports and guides various rotative parts of the article forming part of the machine. The hub 19 of the part 7 of the Geneva gear is made in the form of a sleeve that fits an enlarged portion 20 of the pedestal 18 which, with the reduced portion 21 of the pedestal 18, forms a shoulder 22 (Fig. 14). The hub 19 is provided with a corresponding shoulder 23 and between these shoulders are located end bearings 24 supported in annular rings for rotatably supporting the intermittently moving part 7 of the Geneva gear.

The parison forming part and the article shaping part of the machine are interconnected by a pair of large gear wheels 29 and 30 that are preferably formed to have flat upper surfaces or webs that constitute platforms for supporting parts of the machine that are carried by the gear wheels in order to perform their functions. The gear wheel 29 is connected to the intermittently moving part 7 of the Geneva gear, and, by its movement with the gear part 7, causes the operation of the mechanical elements of the article shaping part of the machine, many of which elements are actuated or controlled in their movement by mechanical elements that are connected to the pedestal 18. The gear 29 also meshes with and rotates the large gear wheel 30 which is not only rotatably supported, but is vertically reciprocable to actuate by rotation or by reciprocation certain of the elements which likewise are directed in their movements by the supporting pedestal and parts attached thereto.

In order to maintain a meshing relation between the gear wheels 29 and 30 and enable reciprocation of the gear wheel 30 and corresponding vertical movements of the parts supported on the gear wheel 30, the gear wheel 29 has the necessary width to allow the sliding movement of the teeth of the gear wheel 30 along the teeth of the gear wheel 29, the teeth of the gear wheel 29 being slightly greater than the summation of the length of the teeth of the gear wheel 30 and the distance that the gear wheel 30 is reciprocated.

The gear wheel 30 is rotatably and slidably supported upon the segmental pedestal 31 whose parts are secured together and are supported on the bed 1. (Figs. 5 and 11.)

The gear wheel 30 surrounds and fits the intermediate segment 32 of the pedestal 31 and is supported indirectly by a piston 33 having a hollow stem 34. The gear wheel 30 is provided with rods 38 that interconnect the gear wheel 30 with a parison mold frame 39. The mold frame is rotatably supported on the hollow stem 34 of the piston member 33 and is thus raised and lowered as the piston 33 is raised and lowered, and by reason of the interconnection with the gear 30 by the rods 38, the gear 30 is also raised and lowered by the movement of the piston 33 within the section 32 of the pedestal 31. Rotation of the piston 33 and its stem 34 is prevented by means of projecting blocks 41 that are secured to the stem 34 and move in ways or slots 42 formed in the section 43 of the pedestal 31. The stem 34 of the piston 33 also carries a cam plate 44 which is operative to mechanically actuate the control elements and manipulate the parts of the parison mold supported on the mold frame 39. The stem 34 of the piston 33 is provided with bearings 45 supported between flanged parts of the cam plate 44 and the mold frame 39 to enable rotation of the mold frame about the stem 34 by the operation of the gear wheel 30.

The parison mold frame together with the molds thereon and the controlling mechanism is thus moved intermittently by the Geneva gear parts 6 and 7, which movement is transmitted through the gear wheels 29 and 30 to the mold frame, to locate the molds supported on the mold frame sequentially in position to gather glass from a suitable glass shelf of a glass producing furnace, such as the shelf 48, indicated in phantom in Fig. 1, and to move the parisons during their formation and finally place them in position for delivery from the parison forming part of the machine to the article shaping part of the machine.

The matrices of the molds 49 into which the glass is drawn may be of varying sizes according to the desired preliminary formation of the glass charge. The molds 49 are supported at each end of the mold frame 39. The frame is formed of two arms that extend across above the gear wheel. The mold frame may be adapted to accommodate other and similar molds by the use of two additional arms extending at right angles to those shown in the drawings and thus parisons of glass may be produced during each of the sequential 90 degree movements of the gear wheels.

The parison molds 49 are formed of two shaping parts, namely the body part 50 and the neck ring shaping part 51 (Fig. 6). Each of these parison forming parts is formed of two sections that when closed form a corresponding part of the matrix of the parison mold 49 into which the glass is drawn when the lower end of the body part 50 is dipped below the surface of the glass in the shelf 48. Each of the sections of the body part 50 of the parison mold is provided with air passageways 53 that extend to the lower end of the parison mold and communicate with the matrix chamber 54 by passageways 55 that extend to the upper end of the sections of the body part 50 of the parison mold and are exceedingly narrow in width to enable the creation of vacuous condition within the matrix of the parison mold without drawing glass into the passageways 55.

The neck ring forming part 51 of the parison mold is provided with a shaping plug 57 that fits in a passageway 58 formed in the neck forming ring 51 when the sections are closed. (Fig. 6.) The plug 57 is inserted into the passageway 58 by the operation of the lever 60 whose movement is transmitted through a rod 61 to which the plug 57 is connected. The lever 60 is actuated on the descent of the mold frame in advance of the insertion of the lower end of the parison mold into the glass. When the plug 57 is inserted in the neck forming ring 51, the head 62 of the plug 57 moves within a mold connector block 64 to open up the connection 65 with the passageway 66 which is connected to the passageways 53 and the chamber 67 in which the head 62 of the plug 57 slidably fits. The head 62 of the plug 57 is provided with the passageways 68 and when the head 62 is down, the passageways 68 connect the chamber 67 with the upper part of the mold to enable production of reduced pressure within the neck forming ring 51 along the surface of the plug 57 to produce at the lower end of the plug 57 a vacuous condition so that the glass may be drawn into this space and shaped by the contour of the surface within the neck forming ring 51 and the end of the plug. This part of the matrix is so shaped as to produce the ordinary lip commonly found in bottles which enables the ready transfer of the parison from the parison forming portion of the machine to the article shaping part of the machine.

The lower end of the plug 57 produces a cavity or recess within the parison that provides a pressure space for blowing the glass of the parison into a hollow article, such as a bottle.

When the lower end of the parison mold 49 dips below the surface of the glass in the shelf 48, a vacuous condition is created in the passageways 53, 65, and 66 by connections which are described below, and operates to draw glass into the parison mold and fill the matrix chamber 54. The mold frame 39 is then raised by the piston 33. (Fig. 5.) The part 6 of the Geneva gear then actuates to rotatively and intermittently move the mold frame 39 and locate a succeeding parison mold 49 in position to enter the shelf 48, at which time the parison that has been formed is transferred to the article shaping part of the machine.

The piston 33 is held in its uppermost position by the pressure within the segment 32 of the pedestal 31 that forms the cylinder 70 in which the piston 33 slidably moves. The pressure created within the cylinder 70 for holding the piston in its uppermost position is produced by a suitable source of pressure supply that is connected through the pipe 73 (Figs. 11 and 19) from a suitable air pressure control mechanism and through which it is exhausted through the said pipe 73 when the piston 33 is lowered by pressure through the pipe 74 and the weight of the structure which also operates to exhaust the air after the piston has been raised (Fig. 5) by the pressure through the pipe 73. The air pressure control mechanism 71 is connected to the source of air pressure supply by means of the pipe 72 and is provided with a plurality of valves 75 to 82, inclusive. (Figs. 10 and 12.) The valves 75 to 82 are operated by the levers 83 to 90, inclusive, that are pivotally supported in the frame of the air pressure control mechanism 71 and overhang the upper ends of the valves 75 to 82. The valves are spring pressed by the springs 92 located intermediate the lower ends of the valves and the bed 1 on which the air pressure mechanism is located, and consequently normally the levers 83 to 90 are raised by the pressure of the springs 92. The air pressure control mechanism is provided with the chamber 93 that communicates with the source of air pressure supply through the pipe 72, and the movable valve members 75 to 82 are located in passageways that communicate with the passageways 96 and with the atmospheric air while the valve members 75 to 82 either direct air under pressure to the cylinders controlled thereby or to exhaust them. The valves 75 to 82 are provided with frustumal flanges 97 that close the chamber 93 by seating upon the valve seats correspondingly formed about the lower ends of the passageways 94. The stems 98 of the valve members 75 to 82 are provided with channels 99 in the surfaces of their enlarged portions above passageways 96. Each valve stem terminates in a head 100 that fits the upper end of the passageway 94 so as to close the passageway when the respective valve member is depressed and open the upper end of the passageway when the valve is raised. Thus, when anyone of the valve members 75 to 82 is depressed, the connection between the pipe 72 and a chamber 94 is established, thereby admitting air pressure to the respective passageway 96, and when the valve is released, the channels 99 establish a connection between the chamber 94 and the external atmosphere, which enables the exhaust of the air within the chamber 94 and the cylinder to which the chamber is connected.

The levers 83 to 90 are operated by the cams 103 to 110 respectively. The cams comprise a plurality of lugs that are secured to a cylinder 111 by means of studs that are threaded into the wall of the cylinder. (Fig. 12.) The cylinder 111 is supported on a pair of stub shafts 112, one of which is rotatably supported in a bearing formed in the wall of a gear box 116, and the other of which is supported in a bracket 118 located on the bed 1. The cylinder 111 is driven by the shaft 3 which carries a sprocket wheel 117 (Fig. 13) driving a sprocket chain 117' (Fig. 18) and sprocket wheel 117 which actuate a suitable reducing gear located in the gear box 116 to which one of the stub shafts 112 is connected to produce the required timing of the cam parts 103 to 110 relative to the rotative movements of the Geneva gear part 6.

The air pressure control mechanism is provided with a plurality of dogs 122 to 125, inclusive, that are pivotally supported on a rod 127 for oscillatory movements produced by the cams 103 to 110 or by the levers 83 to 90 as the cams are moved over the projecting lugs or arms 128 of the dogs. The lower ends of the dogs are drawn by the springs 133 yieldingly against the shoulder 134 formed on the frame of the valve control mechanism 171 (see Fig. 10).

In the glass shaping machine illustrated in the drawings, there are four pistons actuated by air pressure supplied from the said source and which are controlled by the air pressure controlling mechanism 71. Thus, two valves are used for controlling each piston to cause it to reciprocally move in one direction or the other. When one of the piston control valves is opened to admit air under pressure to one side of the piston to cause movement of the piston, the other valve associated with the piston is opened to permit exhaust of the cylinder from the other side of the piston. Hence, the dogs 122 to 125 are associated with each pair of levers that operate the associated valves, and the cams that are associated with each valve engage the arms 128 of the dogs to release the previously operated associated valve as the pressure of the air is altered from one side to the other of the associated piston whereby the air pressure may be established on one side of each piston, and the pressure on the other side of the piston may be reduced to atmospheric pressure by the connection established with the said other side to the atmosphere through the valve stem.

Thus, each of the cams 103 to 110 in advance of opening a valve operates to release the previously opened associated valve. (Fig. 10.) Each lever 83 to 90 is provided with an inclined edge end part 130 that engages a flanged edge part 132 of its associated dog and operates to depress the dog, and when it has moved below the flanged part 132, spring 133 returns the dog to its original position and locks the valve open to maintain the pressure of the corresponding side of the piston with which the valve is associated until the appropriate cam operates first on arm 128 to release the locked valve and then on the lever which opens the valve admitting pressure to the other side of the piston.

The piston 33 is controlled by the levers 83 and 84 which operate the valves 75 and 76. When the valve 75 is opened, the piston 33 is raised and held in its uppermost position within the cylinder 70 by the air pressure transmitted through the pipe 73, as shown in Figs. 5 and 11, and the lever 83 is locked by the dog 122 to retain the valve open and thus retain the piston 33 in its upper position. In order to produce the downward movement of the mold frame 39, the cam 104 engages first the arm 128 of the dog 122 to release the lever 83 and allow spring 92 to raise valve 75, thus shutting off pressure from pipe 73 and connecting it to the atmosphere through the channels 99 in the valve stem of the valve 75. Continued movement of cam 104 depresses lever 84 and valve 76 and admits pressure from chamber 93 to pipe 74 and the upper end of the cylinder 70, and the mold frame 39 descends.

As the piston 33 approaches the lower end of the cylinder 70, it engages a cushioning member 138. The cushioning member 138 is slidably located in a boss 140 formed in the end plate 141 of the cylinder 70 and is supported by a piston 142. The piston is located within a cylinder 143 connected to the source of air pressure supply so as to pneumatically absorb the shock of the descending weight of the gear wheel 30 and the mold frame 39. If desired, the cylinder 143 may be provided with a suitable ball check valve 144 to permit exhaust of the air as the piston 142 is forced downward by the engagement of the piston 33 with the cushioning member 138. (Fig. 11.)

After a sufficient interval of time to allow the glass to be drawn into the matrix chamber 54 of the parison mold, as determined by the rotation of the cylinder 111, the valve 76 is released and opens the upper end of the cylinder 70 to atmospheric air through the pipe 74 while the valve 76 operates to connect the source of air pressure supply to the lower end of the cylinder through the pipe 73 (Fig. 19), and the piston 33 and mold frame 39 is raised.

During the period that the parison mold 49 is in glass gathering position, the lever 60 is operated to push the plug 57 into the upper end of the matrix chamber 54 (Fig. 5) and is held therein by the operation of the cylinder 147 and its associated piston. The cylinder 147 is connected to the air pressure control mechanism 71 by means of the pipes 145 and 146, and the movement of the air therethrough is controlled by the valves 77 and 78, which are operated by the levers 85 and 86 that are alternately depressed by the cams 105 and 106 and locked to valve open positions by the dog 123. The lever 60 operates against the resiliency of the spring 149 located intermediate the discs 150 and 151 which operate to return the lever 60 when it is released by the operation of the cylinder and piston 147 and to withdraw the plug 62 from the upper end of the chamber 54 and form the pressure cavity within the neck portion of the parison. The lever 60 is released shortly after the filling of the matrix chamber 54 of the mold 49.

As the mold dips into the glass of the shelf 48, a source of supply of air at a pressure below atmospheric, commonly referred to as the "vacuum", is connected with the parison mold 49 through pipes and passageways that connect with the passageways 65 that draw the air from the matrix of the mold.

The mold connector blocks 64 are located in the ends of the mold frame 39 and extend through passageways 155 that communicate with the passageways 65 and 66. The passageways 155 in the ends of the mold frame 39 are connected by pipes 156 to the connector sleeves 158 that connect the passageways with a valve mechanism 159. (Figs. 3, 5 and 9.)

The valve mechanism 159 operates to open the valve when the mold frame descends. The connector sleeve 158 is supported in the gear wheel 30 and is provided with a contacting ring 160 accurately ground to fit a coacting contact ring 161, supported on the valve mechanism 159 by means of a plurality of fingers 162. The under side of the coacting connecting ring is provided with a frustumal shaped portion 163 that fits a corresponding seat 165 formed in the end of the valve casing 166. The valve casing 166 is supported on the slidable yoke or plate 167 that is spring pressed by means of the springs 168 located on a pair of guide rods 170 that extend through the yoke 167 and are secured in the frame 171 of the valve mechanism. The frame 171 is secured to the bed of the machine. The springs 168 thus operate intermediate the plate 167 and the frame 171 to yieldingly press the plate 167 against an enlarged part of the valve casing 166 and thus yieldingly press the coacting connecting ring 161 against the connector ring 160 when the gear wheel 30 descends, and when the gear wheel 39 is raised, the springs 168 raise the valve casing 166. The casing 166 has a port 172 that registers with a port 174 located in a cylinder 175 forming a part of the frame 171, when the sleeve 166 descends, and establishes the connection with the source of "vacuum", and when the sleeve 166 is raised, the port 172 is carried upward within the cylinder 175 and out of register with port 174. The port 174 communicates with the passageway through the pipe 176, (see Fig. 1) which is connected to the source of vacuum. Consequently, when the gear wheel 30 and the mold frame 39 descend, the passageway 155 is subject to the vacuous condition produced by the source of "vacuum" supply and communicates through the passageways 65 and 66 with the passageway 53 substantially at the time that the lower end of the parison mold 49 enters the glass in the shelf 48, and, when the piston and cylinder 147 operates the lever 60, (Fig. 5) the head 62 descends to connect the passageway 65 and establish a connection along the surface of the plug 57 with the upper end of the matrix of the mold. When the matrix of the mold is filled, and the mold frame is raised by the operation of the piston 33, the vacuum connection is broken by this movement of the mold frame. It will be understood that plug 62 rises when lever 60 is released, as described above.

Upon the rise of the mold frame 39, a glass shearing member 201 is moved across the lower end of the parison mold 49 to shear the adhering gob of glass (see Figs. 3, 5 and 8). The movement of each shear mechanism 179 occurs when its associated mold has been raised a short distance from the surface of the glass in the shelf 48. Each of the shearing mechanisms 179 comprises a rod 180 slidably supported in the gear 30. The rod is provided with a knob 181 and a roller 182. The knob is formed on the end of a bolt that is secured in the lower end of the rod 180. The knob 181 engages a cam mechanism 184 (Fig. 17) that enables the roller 182 to move with reference to the cam 186 to locate the roller 182 in position to cause rotation of the rod 180. When the rod 180 descends, the knob 181 engages the sloping surface 185 of the cam 186. The cam 186 is rotatably supported on a rod located in the standard 187 that is supported on the bed 1 of the machine (see Figs. 3 and 11). The cam member is provided with an arm 188 to which is connected a spring 189, the opposite end of the spring being connected to a bracket located on the bed 1 of the machine, and thus, the cam 186 is biased to yieldingly respond to the engagement of the knob 181 and to cause the cam to return to its normal position when the roller and the knob descend below the cam 186. The standard 187 is provided with a limiting pin 190 that engages a lug 191 formed on the cam part 186 and coacts with the lug 191 to limit the rotative movement of the cam by the spring 189.

When the roller 182 and the knob 181 descend below the cam 186, the cam returns to a position such that upon rise of the mold frame 39, the roller will engage the cam surface 192 which causes the rod 180 to rotate. The rod 180 is provided at its upper end with a bell crank lever 194. (Figs. 5 and 8.) The arm 195 of the bell crank lever 194 is connected to a link 196. The link 196 is connected to an arm 197 located on the rod 198. The rod 198 is provided with an arm 200 to which is connected the shearing knife 201 of the type well known in the art. The knife 201 is so moved with respect to the parison mold 49 as to swing across and substantially against the lower end of the mold as the mold rises from the glass.

The knife 201 is moved downward by the movement of the rod 198 as the gear wheel 30 turns a short distance from the gathering position. The stem 34 of the piston 33 is provided with a collar 203 on which is mounted the bracket 204 that supports the cylinder and piston 147 in position to actuate the lever 60. The collar 203 is also provided with a cam supporting flange 205. (Figs. 2 and 5.) A cam part 206 is secured by suitable bolts 207 located in the slot 208 that enables arcuate adjustment of the cam 206 with reference to the axis of rotation of the head 39. A lever 210 is pivotally supported on the mold frame 39 and in position to be actuated by the cam 206 as the mold frame rotates relative to the stem 34. The lever is provided with the roller 211 that engages the edge part of the cam 206 and the edge of the flange 205. As the roller 211 engages the cam 206, it swings the lever 210 and moves a link 214 which operates the bell crank lever 215 to which the link is connected. (Figs. 1 and 3.) The bell crank lever is supported by a bracket 216 on a tie rod 38 proximate with a rod 198 of each shear mechanism. Each of said tie rods 38 is provided with threaded portions on which are located the nuts 217 whereby the bracket 216 and the bell crank lever 215 may be adjustably located with respect to the upper end of the rod 198 to adjust the length of the movement of the rod 198 which carries the knife 201 and moves the knife 201 downwardly a short distance below the lower end of the parison mold 49. Set screw 218 in the end of lever 215 also facilitates accurate adjustment.

Substantially at the time of the short downward movement of the knife 201, the upper end of the parison within the parison mold is subject to pressure to enlarge the cavity formed by the plug 57. This is done in the rotation of the mold frame 39 susbtantially at the time that the knife is removed from the lower end of the mold. Two of the tie rods 38 are provided with brackets for supporting the valves that control the flow of the air from the source of air pressure supply into the mold to enlarge the cavity formed in the upper end of the parison by the plug 57. Each mold connector block 64 is provided with a passageway 222 which communicates with the lower end of the chamber 67 and so as to be closed by the head 62 when the plug 57 is inserted into the matrix of the mold. The passageway 222 is connected with the valve 223 by the pipe 224 and to each of the two parison molds (Figs. 3 and 5).

The valves 223 are operated by a cam 226 secured to the cam plate 44. The stem of the valve is provided with a roller 227 (Fig. 1) which is located at a point below the cam plate 44 and in proximity thereto and so as to be engaged by the cam 226 (Figs. 3 and 4) and depressed by the downwardly extending portion of the cam to open the valve. The valve 223 is connected through a pipe 228 with a groove 231 around the stem 34 of the piston 33, which is connected by an opening 230 to a passageway 232 formed in a thickened part of the wall of the stem. The passageway 232 connects with a pipe 235 which connects with the source of supply of air under pressure. Thus, during the rotation of the mold frame 39, there is a constant connection between the source of pressure supply and the valves 223. The cam 226 is relatively short but sufficient to give the desired air pressure for a length of time to produce a materially enlarged cavity in the neck of the parison.

Subsequent to the enlargement of the cavity of the parison, the knife 201 is further retracted from the lower end of the parison mold by means of the return movement of the bell crank lever 194 located on the rod 180. (Fig. 8.) The bell crank 194 is provided with an arm 237 on which is located a roller 238. When the mold frame 39 and the gear 30 are raised, the roller 238 of the rod 180 is disposed in position to be engaged by the cam 240 supported on the cam plate 44 by means of the rods 241 that depend from the cam plate. The cam 240 is adjustably located with reference to the axis of rotation of the gear 30 and the mold frame 39 by means of the slots 243 through which the rods extend and is secured by means of the nuts 244 (see Fig. 1) located on the threaded end portions of the rods. As the mold frame 39 and the gear 30 rotate, the arm 237 is actuated to return the shear mechanism 179 to its normal retracted position.

The parison charged mold 49 now moves to the point of delivery of the parison to the article forming part of the machine. As the parison charged mold approaches the delivery point of the parison, the mold sections of the lower part 50 of the mold 49 open. The sections are supported by a pair of arms 248 that are pivotally supported on the mold frame 39 by means of the rod 249. (Figs. 4, 5, and 7.) The arms are provided with the ears 250 to which are connected the toggle links 251. The toggle links 251 are connected to a pin 252 located on the mold frame 39. Links 254 are connected to the joint of the toggle links 251. The links 254 are connected to a slide 255 which upon operation causes the opening of the lower part 50 of the parison mold. The slide 255 is slidably supported in the hanger 256 supported on the mold frame 39. The slide 255 is provided with a rod 257 that extends through a slide block 258. A spring 259 is located intermediate one end of the slide block and one end of the slide. The slide block is slidably supported on the rod 257 and the spring 259 provides a resilient means for transmitting pressure produced by movement of the slide block 258. The slide block 258 is provided with a roller 261 that is operated by the cam plate 44 to locate and maintain the roller in the desired relation with respect to the axis of rotation of the mold frame to either cause opening of the lower sections of the parison mold 49 or to maintain the sections closed during the rotation of the mold frame 39.

The cam plate 44 is provided with a mold opening portion 262, a mold closing portion 263, and a circular edge portion 264 which maintains the mold closed. As the roller 261 moves in the cam portion 262, the arms 248 will open the lower sections of the parison molds 49 as they approach the delivery point of the parisons.

When each parison mold is located in position for delivery of the parison to the article forming part of the machine, a succeeding parison mold is located in a position to receive the charge when the mold frame 39 descends by the operation of the piston 33.

The neck ring mold 51 which forms a part of the parison mold is secured in connecting relation to the mold connector block 64 by means of the clamping arms 267 which are pivotally supported upon the pin 268 that is connected to the mold frame 39. The arms are provided with semicircular channeled sections 266 that clamp the flange 265 of the neck ring mold 51 to the lower end of the mold connector block. The arms 267 are also provided with the ears 269 to which the links 270 are connected. (Figs. 4 and 5.) The ends of the links are connected to a yoke member 271, and the yoke 271 is supported upon a rod 272 that is slidably supported in the hanger 256 connected to the mold frame 39. The rod 272 is provided with a collar 275 having ears 276. Also, the rod is spring pressed by means of the spring 277 located intermediate the collar 275 and a projection 279 formed on the hanger 256. The rod 272 is slid by means of the yoke 280 located on the end of a lever 281. The lever is pivotally supported in a bracket 283 which is secured to the mold frame 39. The lever 281 is operated by a cylinder and piston 286. The cylinder 286 is connected to the air pressure control mechanism 71 by means of the pipes 287 and 288, and the movement of the air therethrough is controlled by the valves 79 and 80 which are operated by the levers 87 and 88 that are alternately depressed by the cams 107 and 108 and locked to valve open positions by the dog 124. (Fig. 19.) The lever 281 is provided with an adjustable bolt 282 that is threaded into one end of the lever to adjust the stroke of the lever with reference to the stroke of the piston.

Upon outward movement of the piston 286 the yoke 280 engages the ears 276 of the collar 275 and, against the bias of the spring 277, moves the rod 272 to cause opening of the sections of the neck ring mold 51. The timing of the operation of the cylinder and piston 286 is set by the location of the cam 107 on the cylinder 111 so that the neck portion of the parison is released from the neck ring portion 51 of the parison mold 49 at the time of closure of an article shaping mold 289.

The article shaping molds 289 are supported on mold supporting frames 299 which are secured to the gear wheel 29. The molds are formed of sections that are caused to open by a cam 294 as each mold approaches the delivery position of the parison. The cam 294 is supported on the upper end of the reduced portion 21 of the pedestal 18. Each mold is also provided with the bottom part 290. The bottom part 290 is enclosed in the lower end of the closed sections of the mold which are provided with channeled portions 291 that fit about the edge portion of the bottom part 290. The mold bottoms 290 are supported on brackets 292 that are connected to the frames 299. (Fig. 14.)

As the parison charged mold reaches its delivery point in the rotation of the gear wheel 30, the receiving mold 289 is located in vertical alignment with the parison forming mold by the corresponding rotation of the gear wheel 29. When the parts of the machine are located in this relation, the gears are locked to insure registration of the mold parts to enable delivery of the parison between the sections of the mold 289.

The gear wheels 29 and 30 are locked by means of a pin 310 that is adapted to enter one of the two sockets. The sockets are located in collars 312 of relatively hard metal located in holders 313. (Figs. 14 and 16.) The pin 310 is operated by a collar 315 secured to a projecting part of the shaft 8. The gear ratio as between the shaft 8 and the gear wheels 29 and 30 is one to four, whereby as each of the sockets 311 are located in registering relation with the pin 310, the pin is released to engage the socket and thus lock the gears. The collar 315 has a cam slot 316 in which is located a roller 317 connected to the pin 310 and operative to raise the pin 310 upon each rotation of the shaft 8. Preferably, the pin 310 is spring pressed by the spring 318 located in a socket formed in the pin 310 and intermediate the bottom of the socket and the frame 9. It is guided in a cylindrical opening formed in the bracket 320. Thus, the gears are locked to insure centering of the parison with respect to the mold sections of the mold 289 as the mold frame 39 descends.

The sections of the molds 289 are supported on interfitting arms 295 which are journaled on the pintle 297. Each pintle 297 is supported on a frame 299. The arms 295 are connected by links 296 to the yoke 298 which is slidably supported on a guide rail 301 forming a part of the frame 299. The yoke 298 is provided with a rod 302 that extends through a wall 303 and through a slidable block 305 having the roller 306 rotatably mounted thereon which is actuated by the cam 294. A spring 307 is located on the rod 302 for resiliently connecting the yoke 298 with the slide block 305. The cam 294 is secured to the pedestal 18, and the roller 306 is shifted by portions of the cam to open and close the sections of the article forming mold 289 at desired points in the operation of the machine to receive the parison or to discharge the article from the mold 289.

The sections of the mold 289 are closed by the operation of the piston 321. The piston 321 is slidably supported in a suitable cylinder 322. The cylinder 322 is connected to the air pressure control mechanism 71 by means of the pipes 323 and 329. The movement of the air is controlled by the valves 81 and 82 which are operated by the levers 89 and 90 that are alternately operated by the cams 109 and 110 and locked to valve open positions by the dog 125. (Fig. 19.) As the piston 321 is moved outwardly, it yieldingly transmits its pressure to a slide block 324 through a spring 325. The spring 325 is located within a socket formed within the slide block 324 and presses against the end of the block. The block 324 is connected to a yoke 326 which moves in the slot 327 formed in the cam 294. (Fig. 15.) The yoke 326 is located to receive the roller 306 from the cam slot 332 of the cam 294 which causes shifting of the roller 306 when the sections of the mold 289 are to be moved to a wide open position. Thus, the roller 306 is moved by the yoke 326 to move the sections of the mold 289 to near its closed position about the parison 328. Complete closure of the mold 289 is prevented by means of the pin 330, located in a slot 331 formed in the slide block 324. The pin 330 has a piston or head 333 located within the shell 335. The head 333 is spring pressed by means of the spring 336 to retain the lower end of the pin 330 in the slot 331. One end of the slot is provided with an opening or recess 337 into which the pin is inserted by the pressure of the spring 336 when the slide block 324 has been moved to locate the sections of the mold 289 to near complete mold-closed positions. The cam 109 precedes the cam 107 in their functional operations (Figs. 12 and 19) so that movement of the piston 321 is initiated to close the sections of the article shaping mold 289 in advance of the opening of the neck ring mold 51 by the operation of the cylinder and piston 286 controlled by the cam 107. The continuing movement of the piston 321 by the exertion of the air pressure increases the pressure of the spring 325 on the end of the slide block 324 until the neck ring mold 51 opens in the manner heretofore described, and, as the neck ring mold opens, the pressure from the source controlled by the valve 81 is transmitted not only to the cylinder 286, but also to the shell 335 by means of the pipe 338 to raise the piston 333. The pin 330 is raised thereby from the opening 337, thereby releasing the slide block 324 and allowing the built up energy of the spring 325 to move the slide block 324 and the yoke 326 to cause complete closure of the mold 289 by a quick or snap movement and thus secure the parison 328 in the mold 289.

The sections of the mold 289 are held closed by the roller 306 in yoke 326 until the wheel 29 rotates, and then the roller moves from the yoke 326, and rides along the circular portion 342 of the cam 294 (Fig. 2). The parison is blown to conform to the matrix of the article shaping mold by the time the gear wheel 29 has rotated substantially 270 degrees.

When the roller rides upon an edge portion 342 of the cam 294, a face cam 343 having a cam slot 344 operates arms 345 that control the position of blow heads 347 (Fig. 14). The blow heads 347 are manipulated by rods 348 that are slidably supported in the mold frames 299 and in sleeves 350 depending from the under side of the web of the gear wheel 29. The blow heads are connected to arms 351 by means of pipes 352 having exterior threaded surfaces that extend through the outer ends of the arms 351. Suitable locking nuts 353 are threaded on to the threaded portions of the pipes 352 to adjustably locate the blow heads 347 with respect to the tops of the molds 289. The inner ends of the arms terminate in sleeves 354 that fit on the upper ends of the rods 348 and are secured in position by suitable nuts. The rods 348 are reciprocated by means of the oscillating arms 345 that move in the slot 344 of the face cam 343 which is located on the reduced portion 21 of the pedestal 18 to which it is secured, and consequently, as the gear wheel 29 rotates, the arms 345 are operated. The arms 345 are yieldingly connected to arms 357 (Figs. 14 and 15). The arms 345 and 357 are journaled on pivot pins 358 supported in the mold frame 299.

The arms 357 are provided with a limiting stop 363 that is engaged by the inward pivotal movement of the arms 345 that swing the arms 357 upwardly. In order that the arms 357 may be yieldingly pressed downward to press the blow heads 347 against the upper ends of the molds 289, pins 359 are connected to the arms 357 and extend through the arms 345 and stops 363. Springs 360 are located on the pins 359 and between a nut located on one end of each pin 359 and a part of the arm 345 whereby upon outward movement of the arms 345, the arms 357 are yieldingly moved, and upon return movement, the arms 345 engage the stops 363 to positively lift the rods 348. Thus, the springs operate to yieldingly press the blow heads 347 on the ends of the molds.

As the rods 348 are raised by the operation of the cam 343, they are rotated a short distance to produce alignment of the blow heads with the molds by means of cam slots 365 formed in the sleeves 350 in which the lower ends of the rods 348 are located. The rods are provided with suitable pins 366 that project into the curved downwardly extending slots 365 so as to cause the rotation of the rods 348 as they are moved down by the operation of the rollers 367 to connect the blow heads with the molds.

The passageway through the blow heads 347 is connected to a source of air pressure supply through valves 369 which are operated by suitable pins 370 that are located on the bed 1. The threaded pipes 352 are connected to flexible tubing 372 (Figs. 14 and 16). The tubings 372 are connected to the pipes 373 which are in turn connected to the valves 369. The valves 369 are supported on the hub 19 of the part 7 of the Geneva gear, and the movable valve members 374 are rotatably supported in the casings 375 of the valves 369. Each of the pipes 373 is connected to a port located on one side of the respective casing, and the pipes 377 are connected to ports located diametrically opposite to the ports to which the pipes 373 are connected. The rotatable valve member is provided with a passageway adapted to register with the ports to establish a connection between the pipes 373 and 377. The valve members 374 are connected to star wheels 378, each star wheel being provided with four arms, and the pins 370 being located on the bed 1 in a position such as to engage the arms to cause sequential operation of the valve members 374 as the valves 369 are carried with the gear 29 over the bed. The pins 370 can be suitably positioned to obtain the desired blowing period.

The pipes 377 are connected to a groove or a passageway 380 formed in the reduced portion 21 of the pedestal 18. The grooved passageway 380 is connected to a passageway 381 formed in a thickened portion of the wall of the stem 21 of the pedestal. The upper end of the passageway 381 is connected to a pipe 382 that communicates with the source of air pressure supply. Thus the glass of the parison 328 is blown to the shape of the surface of the matrix of the article shaping molds 289.

In the subsequent movement of the gear wheel 29, the blown article within the mold 289 is carried to the point at which the article is to be discharged from the article forming machine. As it approaches this point, the roller 306 enters the cam slot 332 of the cam 294 to actuate the yoke 326 which in turn actuates the arms 295 to separate the sections of the mold 289. When the article has been thus formed, and the sections of the mold 289 are opened, the bottle may be removed.

During the succeeding 90 degree movement, the roller 306 will be carried by the cam yoke 326 in slot 332 to the slot 327, so as to completely separate the sections of the mold 289 for receiving the parison 328 as it is delivered to the position of transfer by the descent of the mold frame 39.

Thus, in the operation of the machine, the gear wheels 29 and 30 are intermittently moved by the parts 6 and 7 of the Geneva gear which causes corresponding movements of the mold frames 39 and 299 that support the molds 49, in which the parisons are formed in one part of the machine, and the molds 289, in which the articles are shaped in the other part of the machine. The parison forming molds 49 are raised and lowered in order that they may be sequentially dipped into the glass shelf 48 to receive charges of the glass by suction and also whereby the parisons 328 that are formed in the molds may be delivered to the article forming molds 289. The suction is produced by the control of a valve mechanism 159 that is actuated by the descent of the mold, frame 39 to connect the mold that is thus being dipped into the glass, with the source of supply of air at a pressure less than atmospheric. As the frame 39 is raised, the shear mechanism 179 is operated by the cam mechanism 184 which gives the shear knife 201 a short movement across the lower end of the mold as the parison mold 49 is raised. Upon rotation of the gear wheel 30, the shear knife 201 is first lowered slightly away from the mold bottom and is then swung laterally from beneath the mold bottom as shown at the right in Fig. 8.

In order to provide a blow recess in the parison in advance of shaping of the article, the glass of which the parison is formed is subject to air pressure which is controlled by the valve 223 which is actuated by the cam 226 until a recess of the desired volume is formed in the central part or core of the parison to produce the desired distribution of pressure and the desired distribution of the glass when the parison blown in the article shaping mold.

The parison molds 49 are carried to the point of transmission of the parisons to the article forming part of the machine. The mold supporting frame 39 again descends to dip a mold located in position to receive a charge of glass from the shelf 48, and at the same time it lowers a formed parison to the plane of an article shaping mold 289 which, by the rotation of the gear 29, has been positioned in alignment with the parison 328 that is carried by the frame 39. In advance of the descent of the frame 39, the sections of the lower part 50 of the parison mold 49 are separated to open the said part of the mold, the neck ring forming part 51 of the parison mold being retained closed for supporting the parison 328 while the parison is being enclosed by the sections of the mold 289. The sections of the receiving article shaping mold 289 are closed as the neck ring part of the parison mold is opened.

The sections of the neck ring part 51 of each mold 49 are opened and closed by the actuation of the piston and cylinder 286 which are operated by the pressure derived from the source of air pressure supply as controlled by the valves 79 and 80 which are actuated by levers that are operated in synchronism with the movement of the frame 39 by cams mounted on the cylinder 111 which is connected to the drive mechanism and rotates at a reduced rate by means of the reduction gear located in the gear box 116 to operate the valves 79 and 80 at the proper times to open the sections of the neck ring part 51 of the mold 49 substantially as the sections of the article shaping mold 289 close with a quick movement about the parison 328, and to close the neck ring part of the mold as the frame 39 rises.

The frame 39 is raised and lowered by the operation of the piston 33 which is controlled by the valves 75 and 76 that are also actuated by levers as controlled by cams located on the cylinder 111. Also, the sections of the article forming mold 289 are closed by the operation of the piston and cylinder 321 and 323 that operate the yoke 326 in closing the sections of the mold 289 about the parison, the sections of the mold, however, being opened by the cam slot 332 of the cam 294. The pressures in the cylinder 323 that actuate the piston 321 are controlled by the valves 81 and 82 which are also actuated by levers that are controlled by cams mounted on the cylinder 111.

When the sections of the mold 289 have been closed, the article forming molds are moved from the parison receiving point, and the blow heads 347 are connected to the molds 289 by the operation of the face cam 343 and also the slots 365 that actuate the rods 348 sequentially to connect the blow heads 347 to the tops of the mold. The source of air pressure supply is connected by the valves 369 to the pipes 373 and 372, the valves 369 being connected with a source of air pressure supply through passageways formed in the pedestal 18. At the termination of about 270 degrees movement of the gear wheel 29, the article forming molds 289 are brought to the point of discharge of the glass articles formed by air pressure on the glass in the molds. At this point, the sections of the mold are separated by the motion of the roller 306 in the cam slot 332 and the formed articles may be removed from the glass shaping molds.

The graph of Fig. 20 diagrammatically illustrates an approximation of the timing of the valve cylinder 111 and the intermittent movement of the gear wheels 29 and 30. The driving part 6 of the Geneva gear and the cylinder 111 rotate two to one. It will be understood that the raising and lowering of the parison mold carrier and the gathering operations at one side of the carrier and transfer at the other side may occur during each dwell of the machine, if there are four molds on each carrier, although the valve operations are indicated on only one side of the diagram in Fig. 20, and only two molds and associated parts are shown on each carrier, for the sake of simplicity of illustration. The mold frame 39 is, therefore, moved through half of one cycle to locate a charged parison mold 49 at the point of transfer.

When a mold 49 has been removed from the shelf 48 of the glass furnace, the cam 103 of the valve cylinder operates to raise the mold frame 39 by the piston 33. The neck ring portion 51 of the mold is then closed by the cam 108 of the cylinder as the mold 49 rises above the article shaping mold 289. The roller 10 of the driving part 6 of the Geneva gear then enters a slot 12 of the driven part 7, the comparative rotation of the cylinder 111 to the 90 degree rotation of the driven part 7 being indicated at 386. Following the period of dwell indicated at 387, the gears 6 and 7 again operate through the gears 29 and 30 to locate the mold frame 39 in position to transfer the parison in the charged mold 49 to a receiving article shaping mold 289 while the parison forming mold, at the opposite end of the mold frame 39, is gathering glass from the furnace. The subsequent actuation of the pneumatically controlled parts of the machine will then occur, while the driving part 7 of the Geneva gear is at rest.

If the mold frame 39 is adapted to support four mold frames 49, it is apparent that the control valve mechanism may be provided with a second series of control cams which will operate during the period of dwell indicated at 387 on the graph, and if more than two pairs of molds were mounted upon each gear, a correspondingly increased number of steps for the Geneva movement and rotations of cylinder 11 would be employed.

I claim:

1. In a glass forming machine, a bed, a plurality of parison molds, a frame for supporting the parison molds, a gear wheel for rotating the frame and supported on the frame, a glass shearing mechanism supported on the gear wheel, a glass shearing knife connected to the glass shearing mechanism and movable over the lower end of the mold, means for lowering and raising the mold supporting frame, a cam located on the bed for actuating the shearing mechanism by the rising movement of the mold supporting frame to move the shear knife across the lower end of the mold supporting frame.

2. In a glass shaping machine, a pedestal, a gear wheel rotatably supported on the pedestal, the pedestal having a cylinder formed therein, a piston located in the cylinder, the piston having a stem slidably supported in the pedestal, a plurality of parison molds having air passageways, a plurality of blocks for supporting the parison molds and having air passageways connected with the air passageways of the molds, a frame rotatably supported on the stem of the piston for supporting the blocks, gear wheels supported on the frame, means for preventing rotation of the pistons with the parison mold supporting frame, a cam secured to the stem of the piston, each of the parison molds having a pair of sections, arms for supporting the sections, means operated by the cam for opening and closing the sections of the parison mold, pneumatic means for lowering and raising the piston, and a suction means for drawing air from the parison mold for gathering glass from a shelf of a furnace.

3. In a glass forming machine, a frame, means for rotatably supporting the frame, a plurality of parison forming molds supported on the frame, means for raising and lowering the frame for inserting the parison molds in sequence in the glass of a glass shelf for gathering glass therefrom, the molds having passageways communicating with the matrices of the molds, a pipe communicating with the said passageways and supported on the said frame, a pipe supported by the said frame, a valve mechanism fixedly supported and connected with a source of supply of air having a pressure less than atmospheric, the pipe located in alignment with the said valve mechanism connected with the parison mold at the gathering position and operative when the said frame is lowered to connect with the casing of the said valve mechanism and to open the said valve for producing a suction in the parison molds to draw glass therein.

4. In a glass shaping machine, a carrier having a plurality of blank molds thereon, means for intermittently rotating said carrier, means for reciprocating the carrier along its axis during the periods of non-rotation, a single valve common to all the molds, independent connections for each mold, and means whereby said independent connections are successively associated with the valve by said reciprocating movement of the carrier as the respective molds reach glass-receiving position.

5. Apparatus for gathering glass comprising a carrier supporting a plurality of suction gathering devices, means for rotating the carrier to bring the devices successively into registration with a pool of molten glass, means for reciprocating the carrier vertically to lower and raise each device while it is in registration with the pool of molten glass, each of said devices comprising vacuum connections, and a stationary vacuum pipe having thereon a valve connection contacted and opened by the vacuum connection on the device in registration with the pool of molten glass when said device is lowered.

6. In an article forming machine, a frame, means for rotatably supporting the frame, a plurality of article shaping molds supported on the frame, each of the molds having a pair of sections, a cam for opening the said sections, means for fixedly supporting the cam, the cam having a movable pneumatically operated cam part for closing the said sections.

7. In glass blowing apparatus, a carrier supporting a plurality of blow molds, means for rotating the carrier intermittently, a stationary cam, connections from each blow mold for opening said blow mold by the action of said cam and the rotation of the carrier, and a fluid operated device for closing each mold successively between periods of rotation at one point in the path of its movement by the carrier.

8. In a glass forming machine, a plurality of article shaping molds, a frame for supporting the said article shaping molds, means for rotating the frame, blow heads, rods for supporting the said blow heads, a cam means for operating each of the said rods for rotating the said rods to and away from the alignment with the molds, a second cam, means for fixedly securing the cam, means operated by the cam and the rotation of the frame for raising and lowering the blow heads to disconnect and connect the blow heads to the molds, a valve in the pipe to said blow head, said valve having a stem with a plurality of projections therefrom and a plurality of stationary projections in the path of said projections from the valve in its path of movement by the rotation of the frame, whereby the valve is turned and the admission of blowing fluid to said blow pipe is governed by the rotation of the frame.

9. In a glass forming machine, a plurality of article shaping molds, frame parts for rotatably supporting the article shaping molds, each of the article shaping molds having two sections, a resilient means connected to the said section, a pneumatic means for operating the resilient means to cause part closing of the said sections, a member for engaging the resilient means for preventing complete closure of the sections of the said article shaping mold notwithstanding continued movement of the resilient means by the pressure means, a second pneumatic means for releasing the said resilient means to completely close the sections of the mold by the stored pressure of the resilient means produced by the said first-named pneumatic means.

10. In a glass forming machine, a frame, means for rotating the frame, a plurality of article shaping molds supported on the frame, each article shaping mold comprising two sections, a cam, means for fixedly securing the cam, means operated by the cam as the frame is rotated relative to the cam to open the sections of the mold, a resilient means for closing the sections of the molds, a pneumatic means for operating the resilient means, a spring pressed means for engaging the resilient means to prevent complete closure of the sections of the mold, a second pneumatic means for releasing the resilient means subsequent to continued movement of the first-named pneumatic means to cause the sections to close with a quick movement by the pressure produced by the first named pneumatic means in the resilient means.

11. In a glass shaping machine, a carrier having a parison mold thereon, a separate carrier having a blow mold thereon, mechanical means for intermittently rotating the carriers, fluid pressure means for raising and lowering one of the carriers while the other carrier is maintained in a fixed plane, and means actuated by said mechanical means for timing said fluid pressure means.

12. Apparatus in accordance with claim 11 and the fluid pressure means comprising a cylinder coaxial with the carrier, a piston in said cylinder and a piston rod rising from said piston and supporting the carrier.

13. In a glass blowing machine, a carrier having a parison mold thereon, a separate carrier having a blow mold thereon, mechanical means for rotating said carriers intermittently, and fluid pressure means timed to lower the parison mold carrier at the end of its rotary movement, to lower the parison mold into registration with the blow mold.

14. In a glass blowing machine, a carrier having a parison mold thereon, a separate carrier having a blow mold thereon, mechanical means for rotating said carriers intermittently, and fluid pressure means timed to lower the parison mold carrier at the end of its rotary movement to lower the parison mold into registration with the blow mold, and a separate fluid means for cushioning the descent of the parison mold carrier.

15. Glass blowing apparatus comprising a parison mold carrier and a blow mold carrier rotatable about parallel vertical axes, mechanical means for rotating said carriers intermittently, a plurality of fluid operated devices for operating said molds between rotational movements of the carriers, and valves operated from said mechanical means and controlling the operation of said fluid operated means.

16. Glass blowing apparatus comprising a parison mold carrier and a blow mold carrier rotatable about parallel vertical axes, mechanical means to rotate said carriers intermittently and place the parison molds successively in vertical registration with the blow molds, fluid operated means for raising and lowering the parison mold carrier, opening the neck portions of the parison mold in registration with a blow mold, and closing said blow mold, and valves operated mechanically in timed relation to said mechanical means for operating said fluid operated means during the dwell in the rotation of the carriers.

17. In glass shaping apparatus, a suction gathering device, a cavity forming plug slidably mounted to move into and out of the upper end of the gathering cavity, fluid operated means for raising and lowering said device, and separate fluid operated means for reciprocating said plug.

18. Apparatus in accordance with claim 17 and comprising a stationary vacuum pipe and means moving with said device and connecting with said pipe when the device is lowered.

19. In glass gathering apparatus, a carrier supporting a plurality of gathering devices, means for rotating said carrier to bring said devices into gathering position in succession, a cavity forming plug in each of said devices slidable vertically into and out of the upper end of the gathering cavity, said device providing vacuum passages from the gathering cavity and controlled by the plug, a stationary vacuum pipe, means moving with said device and connected, by the lowering of the device, with said pipe, and separately timed means for lowering and raising said plug.

20. Apparatus for gathering glass comprising a suction gathering device, means for lowering the device to contact a pool of molten glass and suck a charge therefrom, means to raise the gathering device, and means actuated by the upward movement of said device to cut off the glass between the device and the pool.

21. Apparatus for gathering glass comprising a carrier supporting a plurality of gathering devices, means for rotating the carrier, and means for reciprocating the carrier vertically, a cut off for each device, and means actuated by the rise of the carrier to operate the cutting stroke of the cut off of the device which is in gathering position.

22. A glass gathering device comprising a rotatable carrier having thereon a series of suction gathering devices, a cut off for each device, means for raising and lowering the carrier while each device is in registration with a pool of molten glass, means actuated by the upward movement of the carrier to operate the cut off device in its cutting stroke, and means operated by the rotation of the carrier to operate the cut off in its return stroke.

23. Apparatus for gathering glass comprising a carrier supporting a plurality of gathering devices, means for rotating the carrier to place the devices successively in registration with a pool of molten glass, means for lowering and raising the carrier while each device is in such registration, a cut off for each gathering device, and a cam for operating the cut off when the device is raised with the carrier at the gathering position, said cam being inoperative during the downward movement of the device.

24. Apparatus for gathering glass comprising a carrier supporting a plurality of gathering devices, means for rotating the carrier to place the devices successively in registration with a pool of molten glass, means for lowering and raising the carrier while each device is in such registration, a cut off for each gathering device, and a cam for operating the cut off when the device is raised with the carrier at the gathering position, said cam being inoperative during the downward movement of the device, and means for imparting the return stroke to the cut off during the rotation of the carrier.

25. In a glass shaping machine, a carrier having a neck mold thereon, means for intermittently rotating the carrier, and means for closing the neck mold between rotational movements of the carrier.

26. In a glass shaping machine, a carrier having a neck mold thereon, means for intermittently rotating the carrier, means for reciprocating the carrier along its axis between periods of rotation, and means at one station of rest of the neck mold for opening the neck mold in its lowest position, and closing it as it is raised from said lowest position.

27. In glass shaping apparatus, a carrier having a plurality of molds thereon each comprising a neck ring, mechanical means to rotate the carrier intermittently, means to open and close the body portion of each mold during the rotation of the carrier, fluid operated means to reciprocate the carrier along the line of its axis between periods of rotation, and fluid operated means to open and close the neck ring during one of its periods between rotation.

28. In glass shaping apparatus, a carrier having thereon a plurality of parison molds each comprising a body portion and a neck ring, mechanical means for rotating the carrier intermittently about a vertical axis, a cylinder coaxial with the carrier, a piston in the cylinder having an upwardly projecting rod upon which the carrier is supported rotatably, means to prevent the rotation of the piston rod, a cam fixed upon the piston rod, and means actuated by said cam for opening and closing the body portions of the parison mold during rotation of the carrier, spring means normally closing the neck ring, fluid operated means for opening the neck ring at one position between periods of rotation, and valves controlled by said mechanical means for timing the said fluid operated means and the admission of fluid under pressure to said cylinder with respect to the rotation of the carrier.

29. Apparatus for gathering glass comprising a carrier rotatably mounted upon a piston rod, mechanical means for rotating the carrier, fluid operated means for actuating the piston rod to reciprocate the carrier axially, a plurality of gathering devices on the carrier, means to prevent the piston rod from rotating with the carrier, a cam mounted on the piston rod and connections actuating portions of the gathering devices from said cam during rotation of the carrier.

30. In combination in a glass shaping machine, a carrier, a continuously rotating shaft, mechanical means driving the carrier intermittently from the shaft, fluid-operated devices on the carrier, valves controlling the operation of said devices, and means driven by said shaft and operating said valves.

31. In combination in a glass shaping machine, a carrier, a continuously rotating shaft, mechanical means driving the carrier intermittently from the shaft, fluid-operated devices on the carrier, valves controlling said devices, a drum driven continuously by said shaft, and cams on the drum operating the valves.

32. Apparatus in accordance with claim 31 and comprising resilient means for closing one of said valves, means to lock the valve in open position when opened by one of said cams, and means to release said lock by another of said cams.

33. In glass shaping apparatus, a continuously rotating shaft, a carrier for glass shaping devices, mechanical means to drive the carrier intermittently from said shaft, means to effect part of the action of said devices by movement of the carrier, fluid-operated means to effect other actions of said devices, valves controlling said fluid-operated means, a drum driven continuously by said shaft, and cams on the drum and controlling the valves.

34. In glass blank forming and blowing apparatus, a continuously rotating shaft, carrier apparatus supporting blank molds, neck molds, and blow molds, mechanical means to drive the carrier apparatus intermittently from said shaft, means effecting part of the opening and closing movements of the molds by the movement of the carrier apparatus, fluid-operating means for effecting the other mold opening and closing movements, valves controlling the fluid-operated means, a cam-carrier driven continuously from said shaft, and cams on the cam-carrier controlling the valves.

ALBERT F. TREMBLAY.